(12) United States Patent
Thakur et al.

(10) Patent No.: US 10,762,227 B2
(45) Date of Patent: Sep. 1, 2020

(54) CONVERGED MECHANISM FOR PROTECTING DATA

(71) Applicant: Rubrik, Inc., Palo Alto, CA (US)

(72) Inventors: Tarun Thakur, Fremont, CA (US); Prasenjit Sarkar, Los Gatos, CA (US)

(73) Assignee: RUBRIK, INC., Palo Alto, CA (US)

(*) Notice: Subject to any disclaimer, the term of this patent is extended or adjusted under 35 U.S.C. 154(b) by 0 days.

(21) Appl. No.: 16/173,976

(22) Filed: Oct. 29, 2018

(65) Prior Publication Data

US 2019/0065772 A1 Feb. 28, 2019

Related U.S. Application Data

(63) Continuation of application No. 14/975,132, filed on Dec. 18, 2015, now Pat. No. 10,114,967.

(60) Provisional application No. 62/093,816, filed on Dec. 18, 2014.

(51) Int. Cl.
*G06F 21/62* (2013.01)

(52) U.S. Cl.
CPC .. *G06F 21/6218* (2013.01); *G06F 2221/2101* (2013.01)

(58) Field of Classification Search
CPC .................................... G06F 21/6218
See application file for complete search history.

(56) References Cited

U.S. PATENT DOCUMENTS

| | | | |
|---|---|---|---|
| 8,612,707 B2* | 12/2013 | Prahlad | G06F 11/1435 707/610 |
| 10,114,967 B2 | 10/2018 | Thakur et al. | |
| 2007/0156793 A1 | 7/2007 | Ravi et al. | |
| 2011/0313974 A1 | 12/2011 | Chen | |
| 2013/0067181 A1 | 3/2013 | Boldyrev et al. | |
| 2013/0238561 A1 | 9/2013 | Subramaniam | |
| 2014/0052694 A1 | 2/2014 | Dasari et al. | |
| 2014/0325616 A1* | 10/2014 | Dolph | G06F 21/64 726/5 |
| 2016/0180109 A1 | 6/2016 | Thakur et al. | |

FOREIGN PATENT DOCUMENTS

EP 1016986 7/2000

OTHER PUBLICATIONS

Gucer et al. ( Deployment Guide Series: Tivoli Continuous Data Protection for Files, 218 pages, May 2006 (Year: 2006).*
"U.S. Appl. No. 14/975,132, Non Final Office Action dated Aug. 8, 2017", 14 pgs.
"U.S. Appl. No. 14/975,132, Examiner Interview Summary dated Oct. 17, 2017", 3 pgs.

(Continued)

*Primary Examiner* — Oleg Korsak
(74) *Attorney, Agent, or Firm* — Schwegman Lundberg & Woessner, P.A.

(57) ABSTRACT

Embodiments disclosed herein provide systems, methods, and computer readable media for a converged mechanism for protecting data. In a particular embodiment, a method provides identifying a level of importance for a plurality of data items and tracking changes to the plurality of data items. The method further provides aggregating the changes based on the level of importance and logging the aggregated changes.

20 Claims, 7 Drawing Sheets

(56) References Cited

OTHER PUBLICATIONS

"U.S. Appl. No. 14/975,132, Response filed Nov. 8, 2017 to Non Final Office Action dated Aug. 8, 2017", 9 pgs.
"U.S. Appl. No. 14/975,132, Final Office Action dated Dec. 15, 2017", 7 pgs.
"U.S. Appl. No. 14/975,132, Response filed Mar. 5, 2018 to Final Office Action dated Dec. 15, 2017", 8 pgs.
"U.S. Appl. No. 14/975,132, Advisory Action dated Apr. 17, 2018", 2 pgs.
"U.S. Appl. No. 14/975,132, Response filed Jun. 15, 2018 to Advisory Action dated Apr. 17, 2018", 8 pgs.
"U.S. Appl. No. 14/975,132, Notice of Allowance dated Jun. 29, 2018", 7 pgs.
"U.S. Appl. No. 14/975,132, Examiner Interview Summary dated May 30, 2018", 3 pgs.
U.S. Appl. No. 14/975,132, U.S. Pat. No. 10,114,967, filed Dec. 18, 2015, Converged Mechanism for Protecting Data.

\* cited by examiner

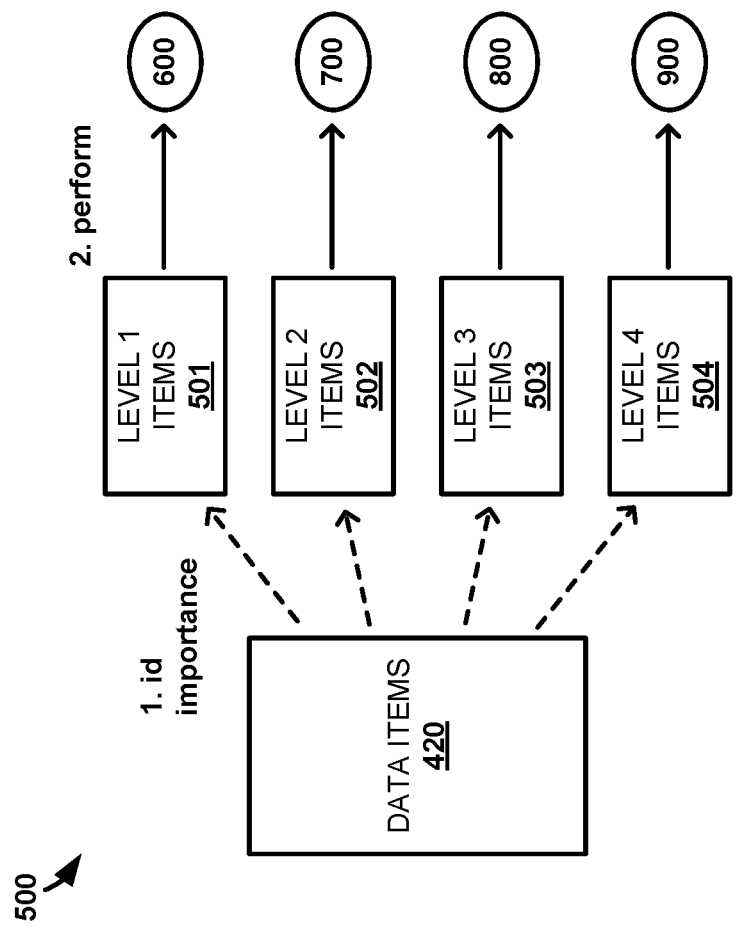

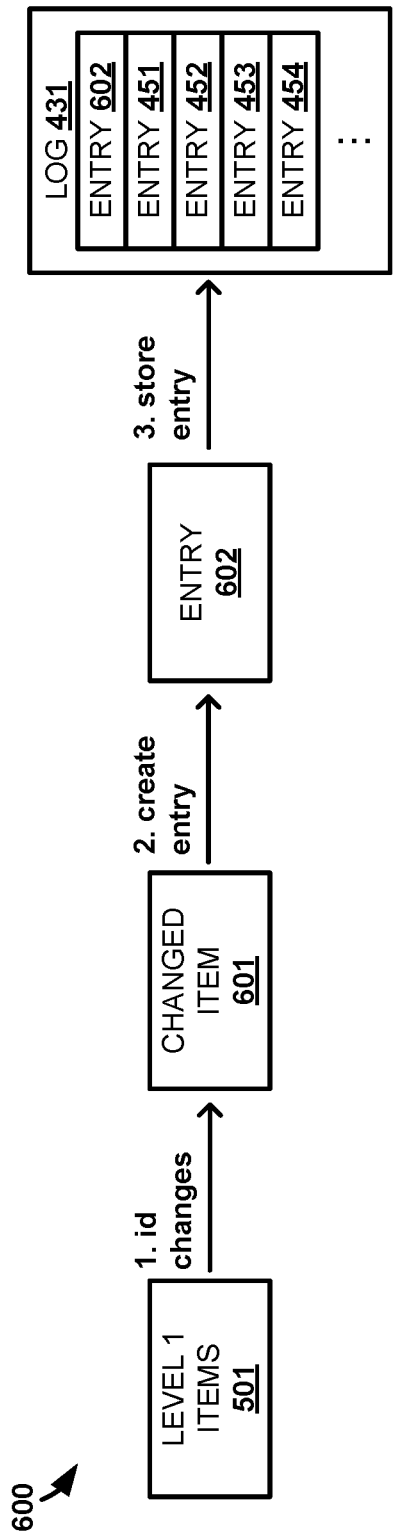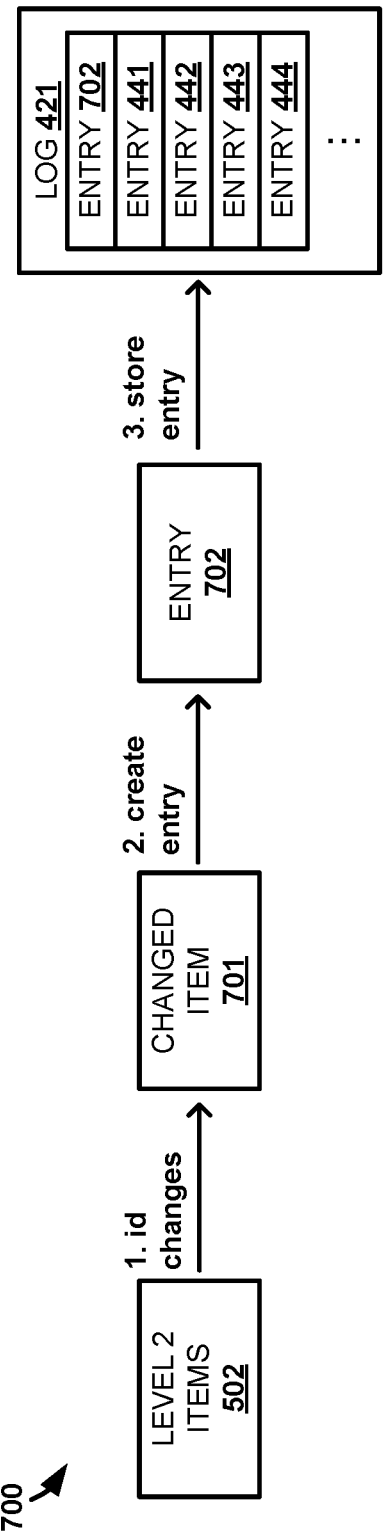

… (1)

CONVERGED MECHANISM FOR PROTECTING DATA

TECHNICAL BACKGROUND

There exist many different methods for protecting data from loss. These methods include synchronous replication, Continuous Data Protection (CDP), backup, and archiving to name a few. Each of these methods may be implemented individually on specified data sets and each provides a different level of protection. Thus, applying one of these protection methods to a large data set that includes data having different levels of importance may result in some of that data being over or under protected.

OVERVIEW

Embodiments disclosed herein provide systems, methods, and computer readable media for a converged mechanism for protecting data. In a particular embodiment, a method provides identifying a level of importance for a plurality of data items and tracking changes to the plurality of data items. The method further provides aggregating the changes based on the level of importance and logging the aggregated changes.

In some embodiments, aggregating changes based on the level of importance comprises aggregating changes to first data items of the plurality of data items more often than changes to second data items of the plurality of data items, wherein the first data items have a higher level of importance than the second data items.

In some embodiments, aggregating changes based on the level of importance further comprises aggregating the changes to the second data items more often than changes to third data items of the plurality of data items, wherein the second data items have a higher level of importance than the third data items, and aggregating the changes to the third data items more often than changes to fourth data items of the plurality of data items, wherein the third data items have a higher level of importance than the fourth data items.

In some embodiments, aggregating the first data items comprises performing synchronous replication on the changes to the first data items and aggregating the second data items comprises performing Continuous Data Protection (CDP) on the changes to the second data items.

In some embodiments, aggregating the changes to the third data items comprises periodically backing up the changes to the third data items and aggregating the changes to the fourth data items comprises archiving the changes to the second data items.

In some embodiments, logging the aggregated changes comprises storing a first log of the changes to the first data items remote to the plurality of data items.

In some embodiments, logging the aggregated changes comprises storing a second log of the changes to the second data items local to the plurality of data items.

In some embodiments, logging the aggregated changes comprises copying the changes to the third data items to a third log and moving the changes to the fourth data items to a fourth log.

In some embodiments, the method further provides restoring at least a portion of the plurality of data items to the primary data repository based on the aggregated changes.

In some embodiments, the level of importance for the plurality of data items corresponds to recovery time and a recovery point objectives for the plurality of data items.

In another embodiment, a data protection system is provided including one or more computer readable storage media and a processing system operatively coupled with the one or more computer readable storage media. The data protection system further includes program instructions stored on the one or more computer readable storage media that, when read and executed by the processing system, direct the processing system to identify a level of importance for a plurality of data items and track changes to the plurality of data items. The program instructions further direct the data protection system to aggregate the changes based on the level of importance and log the aggregated changes.

BRIEF DESCRIPTION OF THE DRAWINGS

FIG. 5 illustrates an operation of the other computing environment for protecting data based on importance of the data.

FIG. 6 illustrates another operation of the other computing environment for protecting data based on importance of the data.

FIG. 7 illustrates another operation of the other computing environment for protecting data based on importance of the data.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide a converged mechanism for protecting data based on importance of the data. Importance may be measured or defined based on any metric for expressing importance. For example, importance may be defined specifically as a desired recovery time and recovery point objectives for given items of data. Data of the highest importance may be protected through synchronous replication. Synchronous replication duplicates every data block to another storage location. Data that is not of the highest importance but still of relatively high importance may be protected through Continuous Data Protection (CDP). CDP writes every changed block (e.g. written to) to a log along with a time when the block was changed. Data of medium importance, which is less important than the data protected using CDP, may be protected through data backups that write a copy of data to another, usually low cost, storage location along with a time when the data was copied. Data of lowest importance is moved (i.e. archived), instead of copied, to another storage location and a time of the move is recorded.

Data in a system is not always of the same level of importance and, therefore, may each require a different type of data protection, as described above. Data items of lower importance can always be protected in the same manner as data of higher importance. However, a method for protecting data of higher importance tends to use more resources (e.g. storage, network, processing, etc.) than a method for protecting data of lower importance. Thus, ideally data will be protected according to its level of importance to conserve resources while still providing adequate protection.

Figure 1:
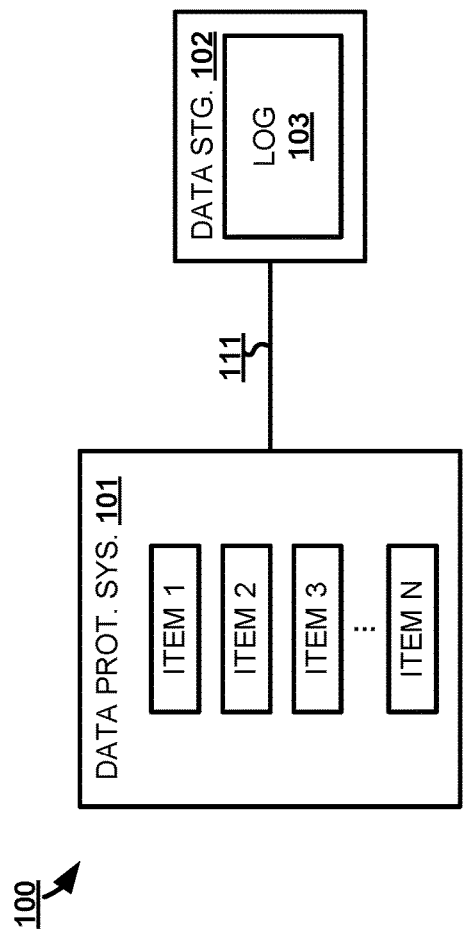
FIG. 1 illustrates a computing environment for protecting data based on importance of the data.

FIG. 1 illustrates computing environment 100 in an example scenario of converged mechanism for protecting data based on importance of the data. Computing environment 100 includes data protection system 101 and data storage system 102. Data storage system 102 includes data log 103. Data protection system 101 and data storage system 102 communicate over communication link 111.

In operation, data protection system 101 aims to replicate the four methods of data protection described above depending upon the level of importance for data. In particular, data protection system 101 tracks changes to data and then logs these changes in log 103 on data storage system 102. The amount of changes included in each log entry depends on the importance of the data. Data of highest importance will have every change logged as an individual entry to mimic the process of synchronous replication. As data importance is lowered, more and more changes are aggregated into each log entry before being stored in log 103. For example, as a period for data backup becomes greater, the data changes are aggregated less often (i.e. once per period) before being stored as an entry into log 103. Hence, the number of importance levels available for data protected by data protection system 101 may be far more granular than the four levels described above.

Figure 2:
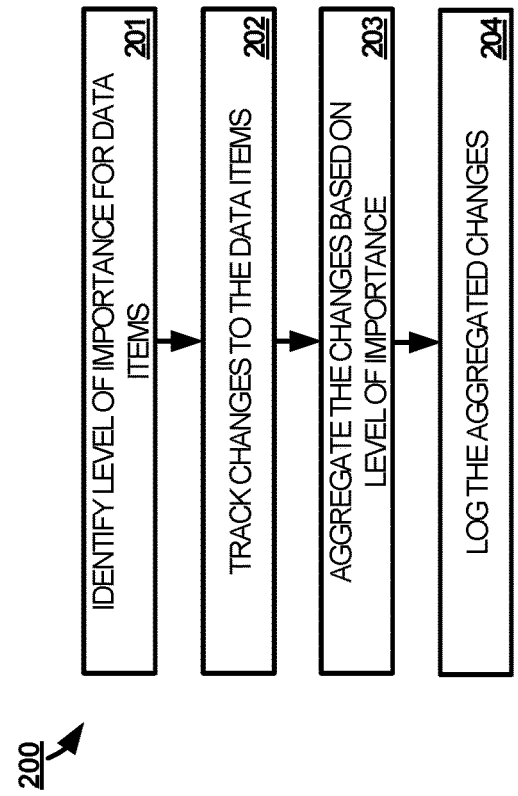
FIG. 2 illustrates an operation of the computing environment for protecting data based on importance of the data.

FIG. 2 illustrates operation 200 of computing environment 100 for protecting data based on importance of the data. Operation 200 includes data protection system 101 identifying a level of importance for a plurality of data items (data items 1-N in this example) at step 201. A user may identify the data items 1-N and the level of importance for those data items. Alternatively, data protection system 101 may examine data items 1-N to determine the appropriate level of importance. The examination may include examining content of data items 1-N, a location(s) where data items 1-N are stored, the processes being run on data items 1-N, or any other information that may indicate a data item's level of importance.

Data items 1-N may be stored in a storage system of data protection system 101 or may be stored elsewhere, such as a local user workstation, a data processing server, a network based storage system (e.g. a storage system similar to storage system 102), or any other system capable of storing data items. In some examples, the functionality of data protection system 101 is incorporated into a system that is processing, creating, or otherwise using data items 1-N. While data items 1-N are number sequentially for ease of explanation, data items 1-N are not necessarily sequential data items.

Additionally, at step 202, data protection system 101 tracks changes to data items 1-N. The changes may include one or more writes to one of the data items or one or more writes creating one or more of the data items. Essentially, anything that changes any of data items 1-N from a previous state is tracked. The previous state is the most recently logged state of a data item (e.g. changes since the last time the data item was protected) or alternatively the state recorded in storage system 102. The changes are then aggregated by data protection system 101 at step 203 based on the level of importance.

If data items 1-N are of the highest level of importance, each aggregation includes only a single change to a data item before the aggregation is stored as an entry in log 103 at step 204. This level of granularity guarantees that a data item can be restored to a previous state or otherwise accessed in that previous state. However, if the importance level of data items 1-N is lower, then multiple changes for each data item may be aggregated into a single entry and stored in log 103 at step 204. While a log entry for a data item having an aggregate of multiple changes does not allow for restoration based on a single one of those changes, the level of importance for the data item should indicate that such a precise restoration is not necessary. The time in which aggregation of changes occurs may be triggered based on time (e.g. aggregate changes every x hours), based on number of changes (e.g. aggregate when a data item has x changes), manually, or some other means for triggering a process.

While operation 200 allows for an infinite number of importance levels, preferably a finite number of levels and corresponding aggregation times are defined. In a particular example, four levels of importance are defined to correspond to the synchronous replication, CDP, backup, and archive processes described above. The highest level, level 1, corresponds to synchronous replication wherein each change to a data item is an entry in log 103. Level 2 corresponds to CDP, which is performed almost identically to level 1, however storage system 102 upon which log 103 is located is not necessarily remote from the storage system on which data items 1-N are stored. That is, log 103 may be stored on the same storage system as data items 1-N. Level 3 corresponds to a backup scheme wherein changes over a backup time period (e.g. every hour, day, or other measure of time) are aggregated and stored as an entry in log 103. Level 4 then corresponds to archiving, which is performed similarly to a backup, however data items 1-N are removed from their primary storage location when stored a entries in log 103.

Advantageously, any data may be identified as having a level of importance 1-4 and data protection system 101 is able to use the same mechanism (i.e. storing entries in a log as described above) to protect the data regardless of the level of importance. Moreover, while the above examples describe only data items 1-N having a common level of importance, data protection system 101 is able to concurrently protect other data items having differing levels of importance. A single log 103 may be used for all entries regardless of importance level or log 103 my be separated into multiple logs with each log separated based on level of importance of the entries stored therein, based on data type, based on user defined partitions, or some other reason for log separation.

Referring back to FIG. 1, data protection system 101 comprises a computer system and communication interface. Data protection system 101 may also include other components such as a router, server, data storage system, and power supply. Data protection system 101 may reside in a single device or may be distributed across multiple devices. Data protection system 101 could be an application server(s), a personal workstation, or some other network capable computing system—including combinations thereof.

Data storage system 102 comprises a communication interface and one or more non-transitory storage medium, such as a disk drive, flash drive, magnetic tape, data storage circuitry, or some other memory apparatus. Data storage system 102 may also include other components such as processing circuitry, a router, server, data storage system, and power supply. Data storage system 102 may reside in a single device or may be distributed across multiple devices. Data storage system 102 is shown externally to data protection system 101, but system 102 could be integrated within the components of data protection system 101.

Communication link 111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be a direct link or may include intermediate networks, systems, or devices.

Figure 3:
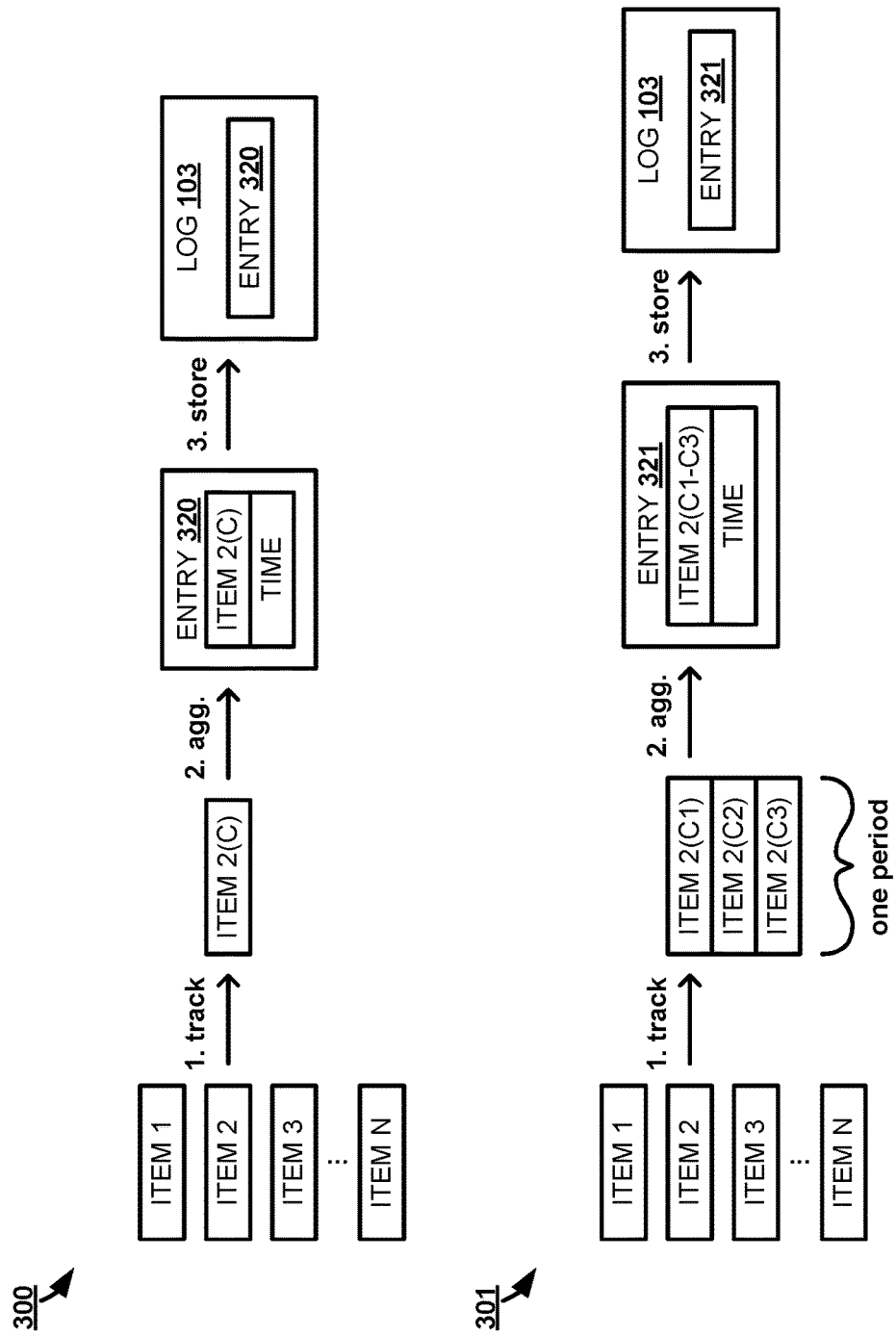
FIG. 3 illustrates operational scenarios of the computing environment for protecting data based on importance of the data.

FIG. 3 illustrates operational scenarios 300 and 301 in an exemplary embodiment. In scenario 300, importance level of data items 1-N is identified to be level 1 or 2, wherein log 103 for level 1 is stored remotely from items 1-N and log 103 for level 2 is stored locally to items 1-N. At step 1, changes to data items 1-N are tracked. A single change is detected to data item 2 and indicated as item 2(C). Since importance levels 1 and 2 both call for each individual change to be logged, item 2(C) is aggregated at step 2 into log entry 320 along with the time of entry 320's creation, which should be roughly equivalent to the time item 2 was changed. At step 3, entry 320 is stored in log 103. In some cases, item 2(C) is stored in its entirety within entry 320 while in other cases only the changes from a previously stored entry are stored.

In scenario 301, the importance level of data items 1-N is identified to be levels 3 or 4, wherein level 3 simply copies changes in entries to log 103 while level 4 moves changes in entries to log 103. In this scenario, a time period is defined for when changes should be aggregated. The time period may be any amount of time and may be defined in any way, such as once every x hours, every day a y and z time, or otherwise. During each time period, step 1 tracks changes to data items 1-N. In this example, item 2 changes 3 times during the time period and the changes are represented as item 2(C1), (C2), and (C3). Once the time period ends, these changes are aggregated into log entry 321 as item 2(C1-C3) along with a time when the entry 321 is created, which should be roughly equivalent to when the time period ended. Entry 321 is then stored in log 103 at step 3. In some cases, item 2(C1-C3) is stored in its entirety within entry 321 while in other cases only the changes to item 2 from a previously stored entry are stored.

It should be understood, that while only changes to item 2 are discussed with respect to scenario 301, other items may also change during the time period. The changes to these other items may be aggregated into entry 321 or may be aggregated into separate entries for storage in log 103.

Figure 4:
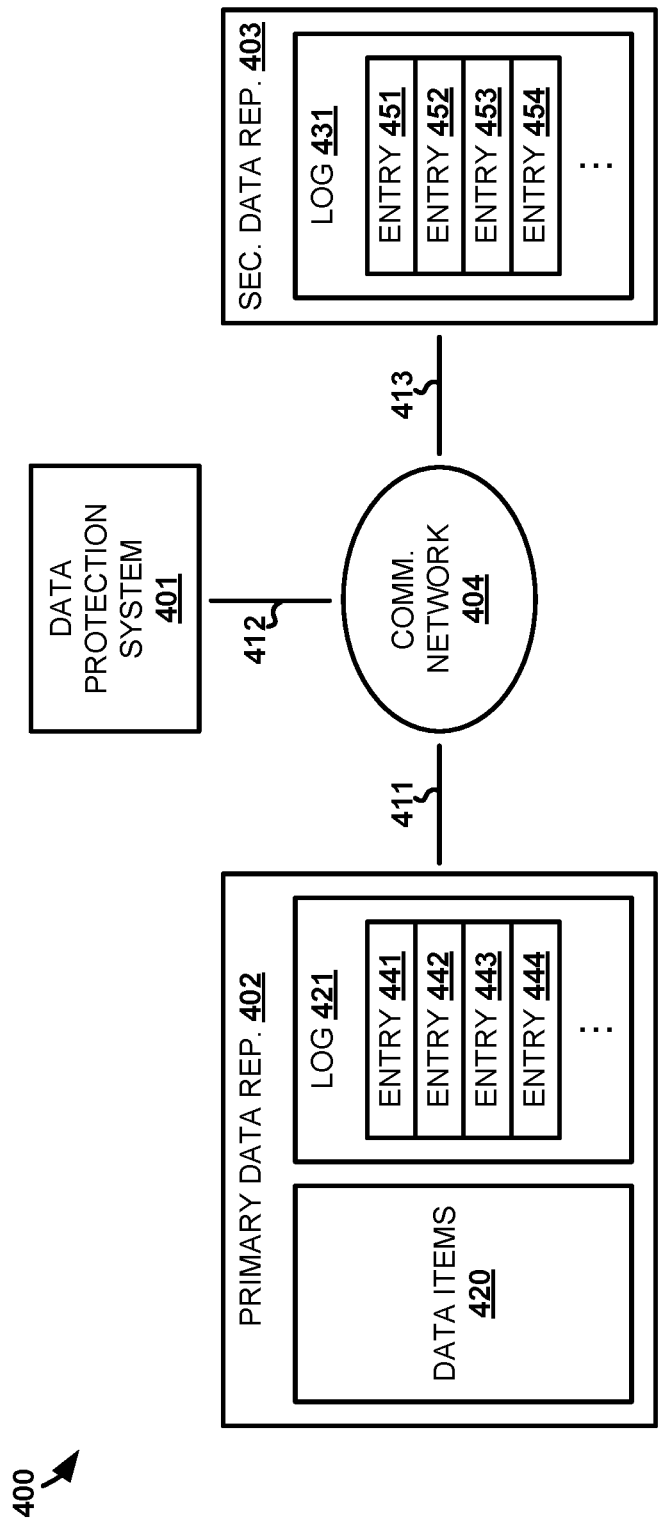
FIG. 4 illustrates another computing environment for protecting data based on importance of the data.

FIG. 4 illustrates computing environment 400 for protecting data based on importance of the data. Computing environment 400 includes data protection system 401, primary data repository 402, secondary data repository 403, and communication network 404. Data protection system 401, primary data repository 402, and secondary data repository 403 communicate with communication network 404 over communication links 411-413.

Communication network 404 comprises network elements that provide communications services to connected systems and devices. Communication network 404 may comprise switches, wireless access nodes, Internet routers, network gateways, application servers, computer systems, communication links, or some other type of communication equipment—including combinations thereof. Communication network 404 may be a single network, such as a local area network, a wide area network, or the Internet, or may be a combination of multiple networks.

In operation, primary data repository 402 stores data items 420 in a storage system similar to storage system 102. Data items 420 may comprise items in a database or may be some other type of data. Data items 420 are data items that are currently in production such that they can be read from, written to, added to, deleted from, etc. Data protection system 401 is charged with protected data items 420 should data items 420 ever need to be restored to a previous condition, as may be the case if primary data repository 402 fails, if data items 420 are erroneously deleted, if erroneously changes were made to data items 420, or for any other reason any of data items 420 may need to be restored to a prior version. Primary data repository 402 and secondary data repository 403 each store log 421 and log 431, respectively. Log 421 and log 431 each include entries containing versions of data items in data items 420 that were previously stored in the manner described below should they ever be needed for restoration or otherwise accessed.

FIG. 5 illustrates operational scenario 500 of computing environment 400 for protecting data based on importance of the data. In scenario 500, data protection system 401 identifies the importance level of data items within data items 420 and categorizes data items 420 into those levels at step 1. In this example, four importance levels 1-4 are used by data protection system 401 with level 1 being the highest level of importance and level 4 being the lowest. The level of each data item may be defined by a user, defined within the data item itself, or through some other means. The importance level may be defined on a data item by data item basis, on a grouping basis (e.g. all data items in a particular section of data), on a categorical basis (e.g. all data items in a certain category or having a certain topic), based on the age of each data item, or defined in some other manner—including combinations thereof. In some cases, if a data item has conflicting levels of importance (e.g. the user defined one level while an administrator or the data item itself defined another), then data protection system 401 may use the higher importance level or may solve the conflict in some other manner.

In one example, each importance level may correspond to a different desired recovery time and recovery point objective. For instance, data items of the highest importance level, level 1, may be data items where the quickest recovery time and the smallest time period between recovery points relative to the recovery times and recovery points of the other importance levels 1-4. As data items get lower in the levels of importance, the recovery times and time periods for recovery points generally increase. In these examples, the level of importance for various data items may be defined based on the desired recovery time and recovery point for the various data items.

In scenario 500, data protection system 401 identifies level 1 data items 501, level 2 data items 502, level 3 data items 503, and level 4 data items 504. It should be understood that while data items 501-503 categorize data items 420, the data items within each of data items 501-504 remain in data items 420. In an example, data protection system 101 may sort data items 420 into levels 1-4 based on the desired recovery time and recovery point for the data items. In some examples, data protection system 401 may reorder data items based on level of importance within data items 420 on primary data repository 402, although such reordering is not necessary. As items are changed in data items 420, data protection system 401 continually identifies the level of importance for the changed items and includes those items in the proper category of data items 501-504. Once categorized, data protection system 401 performs one of operations 600, 700, 800, and 900 on data items 501-504, respectively.

FIG. 6 illustrates operation 600 of computing environment 400 for protecting data based on importance of the data. Operation 600 protects level 1 data items 501 in manner analogous to synchronous replication. Level 1 data items 501 include the highest level of importance and are therefore protected most often. As such, in operation 600, data protection system 401 identifies each change to a data item individually, and substantially immediately after any change occurs, at step 1. Changed data item 601 is one of the changed data items of level 1 data items 501 for this example. An entry 602 is then created having changed data item 601 therein at step 2. Entry 602 is then stored in log 431 of secondary data repository 403 at step 3 along with previous entries 451-454. By storing entry 602 in secondary data repository 403 remote from primary data repository 402, changed data item 601 is protected almost immediately upon its creation even from failure of primary data repository 402.

FIG. 7 illustrates operation 700 of computing environment 400 for protecting data based on importance of the data. Operation 700 protects level 2 data items 502 in manner analogous to CDP. Level 2 data items 502 include the second highest level of importance and are therefore protected just as often as level 1 data items 501. In operation 700, like operation 600, data protection system 401 identifies each change to a data item individually, and substantially immediately after any change occurs, at step 1. Changed data item 701 is one of the changed data items of level 1 data items 502 for this example. An entry 702 is then created having changed data item 701 therein at step 2. Entry 702 is then stored in log 421 of primary data repository 402 at step 3 along with previous entries 441-444. By storing entry 702 in primary data repository 402, changed data item 701 is protected almost immediately upon its creation. Unlike operation 600, entry 702 is stored locally to primary data repository 402 and is therefore not necessarily protected from failure of primary data repository 402. Thus, log 421 may itself be protected by data protection system 401. For example, log 421 may itself be considered level 3 or 4 data within data items 420.

Figure 8:
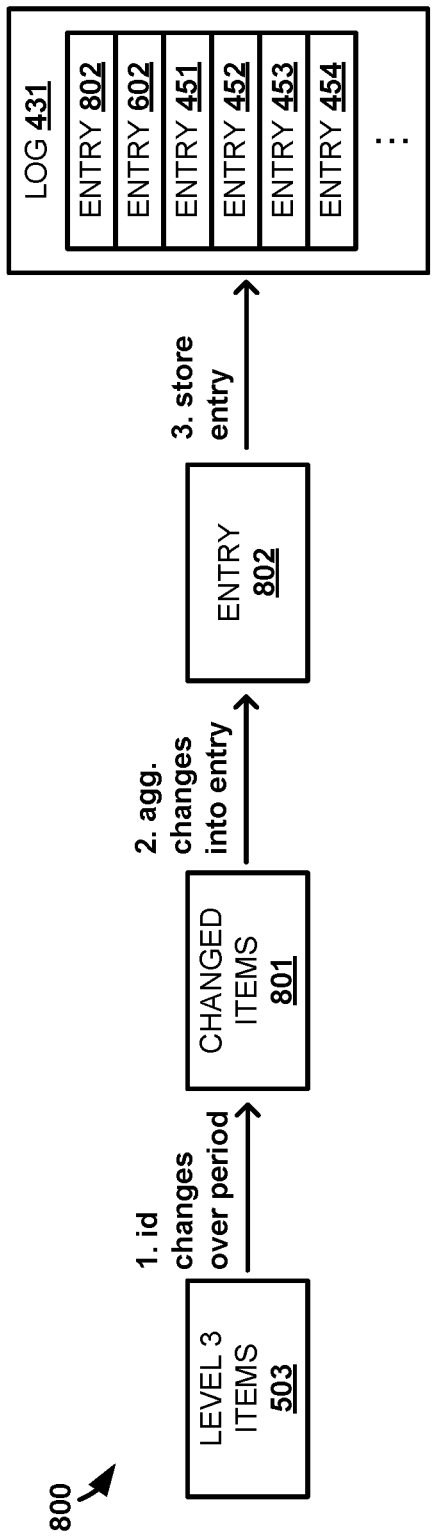
FIG. 8 illustrates another operation of the other computing environment for protecting data based on importance of the data.

FIG. 8 illustrates operation 800 of computing environment 400 for protecting data based on importance of the data. Operation 800 protects level 3 data items 503 in manner analogous to backing up level 3 data items 503. Level 3 data items 503 include the third highest level of importance and are therefore not protected as often. In operation 800, data protection system 401 identifies all changes to level 3 data items 503 over a period of time, at step 1. The period of time may be any possible period of time (e.g. every hour, day, week, etc.), which may be defined by a user or otherwise. Changed data items 801 are the result of step 1 in this example. Changed data items 801 are aggregated into a single entry 802 at step 2. Entry 802 is then stored in log 431 of secondary data repository 403 at step 3 along with previous entries 451-454. To further illustrate that multiple levels of protection can share a single log, log 431 is further shown to include entry 602 that was stored as the result of operation 600.

While aggregating changes periodically, as does operation 800, may allow for gaps to exist should level 3 data items 503 ever need to be restored, level 3 data items 503 are of lower importance and that risk should be outweighed by the benefits of not backing up as often. Should a user decide that any of level 3 data items 503 should be backed up more often, then the user may redefine those data items to have a higher level of importance for future protection. Additionally, while this example on has one time period for backing up data items, more importance levels may be defined that each backup data items over different time periods (e.g. a level for daily backups and another level for weekly backups). Generally, it can be assumed that shorter periods of time between backups will equate to fewer changes being aggregated at each backup. Therefore, if more aggregation points are desired for certain data items such that fewer changes are aggregated at each point, those data items should be categorized at an importance level having a shorter time period between backups.

Figure 9:
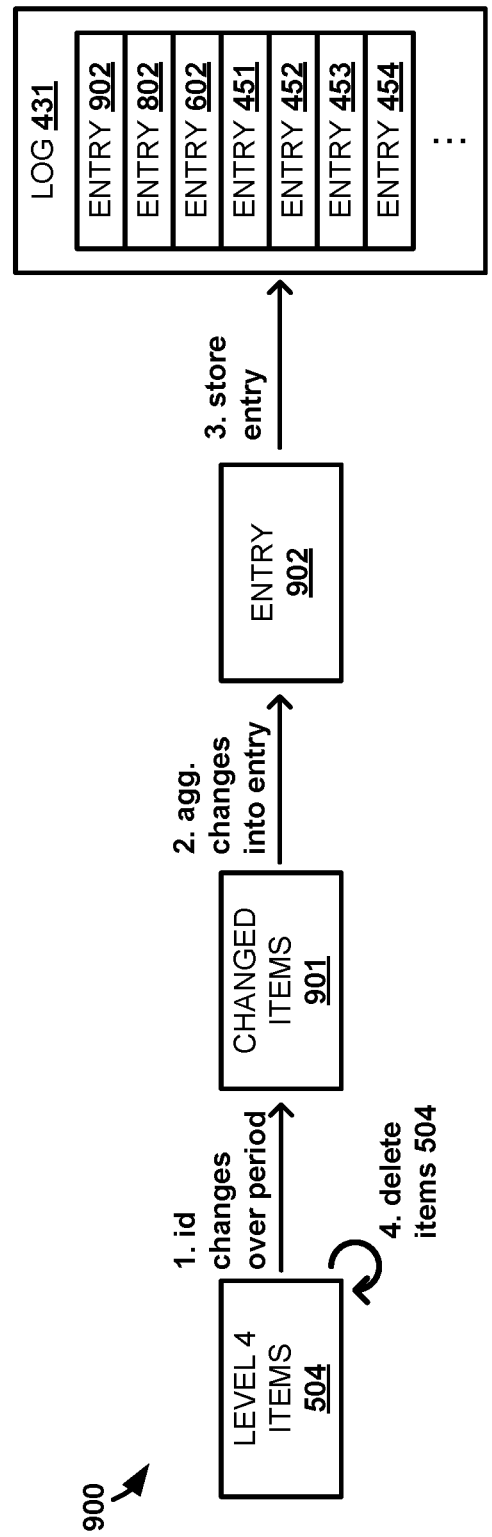
FIG. 9 illustrates another operation of the other computing environment for protecting data based on importance of the data.

FIG. 9 illustrates operation 900 of computing environment 400 for protecting data based on importance of the data. Operation 900 protects level 4 data items 504 in manner analogous to archiving level 4 data items 504. Level 4 data items 504 include the lowest level of importance and are therefore not protected often. In operation 900, like operation 800, data protection system 401 identifies all changes to level 4 data items 504 over a period of time, at step 1. The period of time may be any possible period of time (e.g. every hour, day, week, etc.), which may be defined by a user or otherwise. Changed data items 901 are the result of step 1 in this example. Changed data items 901 are aggregated into a single entry 902 at step 2. Entry 902 is then stored in log 431 of secondary data repository 403 at step 3 along with previous entries 451-454. Also, to further illustrate that multiple levels of protection can share a single log, log 431 is further shown to include entry 602 that was stored as the result of operation 600 and entry 802 that was stored as the result of operation 800.

Moreover, since operation 900 archives changes 901 to level 4 data items 504 since a previous archive or backup of level 4 data items, level 4 data items 504 are deleted from data items 420 in primary data repository 402 at step 4. Thus, any data items that are categorized as level 4 are moved to secondary data repository 403 and no longer use storage space in primary data repository 402.

Advantageously, using log 421 and log 431, as described above, allows data protection system 401 to protect data items having different levels of importance with the same log mechanism.

Figure 10:
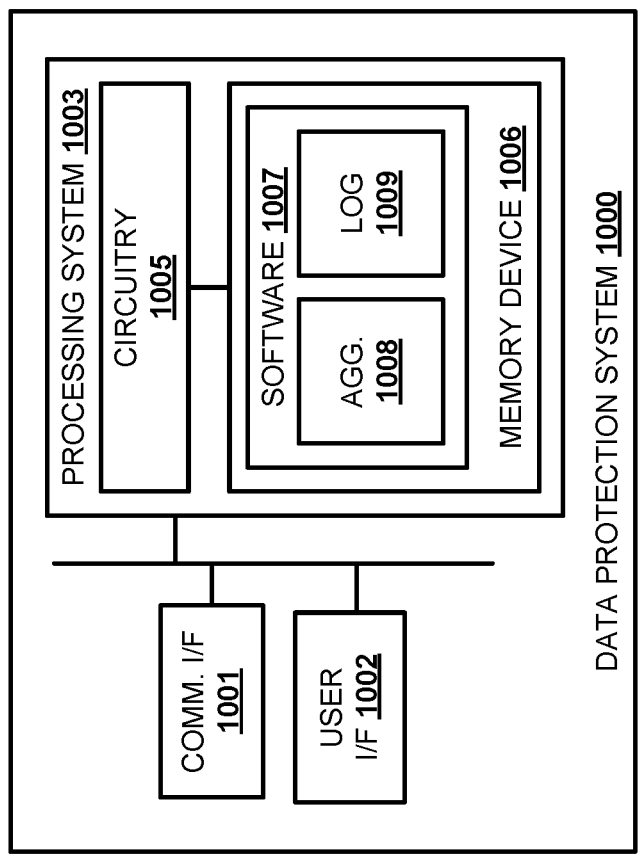
FIG. 10 illustrates a data processing system for protecting data based on importance of the data.

FIG. 10 illustrates data protection system 1000. Data protection system 1000 is an example of data protection system 101, although system 101 may use alternative configurations. Data protection system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes aggregation module 1008 and log module 1009. Operating software 1007 may further include an operating system, utilities, drivers, network interfaces, applications, or some other type of software. When executed by circuitry 1005, operating software 1007 directs processing system 1003 to operate Data protection system 1000 as described herein.

In particular, aggregation module 1008 directs processing system 1003 to identify a level of importance for a plurality of data items. Aggregation module 1008 further directs processing system 1003 to track changes to the plurality of data items and aggregate the changes based on the level of importance. Log module 1009 directs processing system 1003 to log the aggregated changes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   tracking, by a data protection system in a computing environment, changes made to a plurality of data items at a primary data repository of a plurality of importance levels over a time period, wherein the computing environment includes the data protection system, the primary data repository, a second data repository communicating with a communication network over communication links;
   for each data item incurring one or more changes over the time period:
   creating one or more changed data items configured to be used for restoring the data item, each changed data item storing a number of changes made to the data item, the number determined based on the importance level associated with the data item, and
   storing the changed data item, wherein a first number for a first data item is fewer than or equal to a second number for a second data item, the first data item associated with a first importance level higher than a second importance level associated with the second data item.

2. The method of claim 1, further comprising for each data item incurring one or more changes over the time period: aggregating the number of changes.

3. The method of claim 1, further comprising for each data item incurring one or more changes over the time period: aggregating the number of changes over a time interval determined based on the importance level.

4. The method of claim 1, wherein the data items are protected according to a plurality of protection policies corresponding to the importance levels.

5. The method of claim 1, wherein a changed data item is created for each change made to a data item of a first importance level among the importance levels.

6. The method of claim 5, wherein the data items are stored at a primary storage location and wherein the change made to the data item is replicated to a second storage location concurrently with the change being made to the data item.

7. The method of claim 1, wherein a changed data item is created for each change made to a data item of a second importance level among the importance levels.

8. The method of claim 7, wherein the data items are stored at a primary storage location and wherein each change made to the data item of the second importance level is stored as a log entry on the primary storage location.

9. The method of claim 1, wherein a changed data item is created to record one or more log entries, each log entry recording a change made to a data item of a second importance level among the importance levels, and wherein the time period is a backup time period defined by a backup policy for the data item.

10. The method of claim 9, wherein the data items are stored at a primary storage location and wherein each log entry is created and stored at the primary storage location.

11. The method of claim 1, wherein a changed data item is created to record one or more changes made to a data item of a third importance level among the importance levels, and wherein the time period is a backup time period defined by a backup policy for the data item.

12. The method of claim 1, wherein a changed data item is created to record one or more changes made to a data item of a fourth importance level among the importance levels, and wherein the time period is an archive time period defined by an archive policy for the data item.

13. The method of claim 1, wherein the changes are determined according to most recent states of the data items.

14. The method of claim 1, wherein tracking the changes comprises receiving the changes from a data storage system storing the data items.

15. The method of claim 1, further comprising restoring one or more data items by using the changed data items associated with the one or more data items.

16. A system comprising:
   a processor; and
   non-transitory memory storing instructions configured to cause the processor to perform:
   tracking, by a data protection system in a computing environment, changes made to a plurality of data items at a primary data repository of a plurality of importance levels over a time period, wherein the computing environment includes the data protection system, the primary data repository, a second data repository communicating with a communication network over communication links;

for each data item incurring one or more changes over the time period:

creating one or more changed data items configured to be used for restoring the data item, each changed data item storing a number of changes made to the data item, the number determined based on the importance level associated with the data item, and storing the changed data item, wherein a first number for a first data item is fewer than or equal to a second number for a second data item, the first data item associated with a first importance level higher than a second importance level associated with the second data item.

17. The system of claim 16, wherein the instructions are configured to cause the processor to further perform for each data item incurring one or more changes over the time period: aggregating the number of changes.

18. The system of claim 16, wherein the instructions are configured to cause the processor to further perform for each data item incurring one or more changes over the time period: aggregating the number of changes over a time interval determined based on the importance level.

19. The system of claim 16, wherein the data items are protected according to a plurality of protection policies corresponding to the importance levels.

20. A non-transitory machine-readable medium for storing instructions that, when executed by one or more hardware processors, cause the one or more hardware processors to perform operations comprising:

tracking changes made to a plurality of data items of a plurality of importance levels over a time period;

for each data item incurring one or more changes over the time period:

creating one or more changed data items configured to be used for restoring the data item, each changed data item storing a number of changes made to the data item, the number determined based on the importance level associated with the data item, and storing the changed data item, wherein a first number for a first data item is fewer than or equal to a second number for a second data item, the first data item associated with a first importance level higher than a second importance level associated with the second data item.

* * * * *